United States Patent
Inoue et al.

(10) Patent No.: US 12,157,436 B2
(45) Date of Patent: Dec. 3, 2024

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Kazuyuki Inoue, Nagoya (JP); Yurika Tanaka, Yokosuka (JP); Satoshi Komamine, Nagoya (JP); Go Tanaka, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/862,573

(22) Filed: Jul. 12, 2022

(65) Prior Publication Data

US 2023/0076294 A1  Mar. 9, 2023

(30) Foreign Application Priority Data

Sep. 8, 2021  (JP) .................................. 2021-146028

(51) Int. Cl.
  *B60R 7/02*  (2006.01)
  *G08G 1/00*  (2006.01)
(52) U.S. Cl.
  CPC ............... *B60R 7/02* (2013.01); *G08G 1/202* (2013.01)

(58) Field of Classification Search
  CPC ........... G60R 7/02; G08G 1/202; G06Q 10/08
  See application file for complete search history.

(56) References Cited

U.S. PATENT DOCUMENTS

| | | | |
|---|---|---|---|
| 8,814,804 B2 * | 8/2014 | Walden | G01N 33/4972 600/543 |
| 2019/0244167 A1 * | 8/2019 | Kaneko | G06Q 10/0833 |
| 2020/0000113 A1 * | 1/2020 | Eaton | F25D 17/042 |
| 2020/0310438 A1 * | 10/2020 | Suzuki | G05D 1/0212 |
| 2021/0065072 A1 | 3/2021 | Tatsumoto et al. | |
| 2021/0136896 A1 * | 5/2021 | Harmon | B60P 3/228 |

FOREIGN PATENT DOCUMENTS

| | | | |
|---|---|---|---|
| CN | 205563268 U | * | 9/2016 |
| JP | 2008-123055 A | | 5/2008 |
| JP | 2021-039432 A | | 3/2021 |

* cited by examiner

*Primary Examiner* — Michael J Zanelli
(74) *Attorney, Agent, or Firm* — Oliff PLC

(57) ABSTRACT

An information processing apparatus is provided which includes a controller configured to control a vehicle that is equipped with a storage device in which baggage can be deposited by a user, and a storing section for storing cushioning material that can be used by the user when the user deposits the baggage in the storage device, wherein the controller performs to generate a command for replenishment of the cushioning material in the storing section when a remaining amount of the cushioning material in the storing section is less than a predetermined amount.

16 Claims, 16 Drawing Sheets

| VEHICLE ID | CURRENT LOCATION | STATUS | ROUTE |
|---|---|---|---|
| V001 | x x x | x x x | x x x |
| V002 | x x x | x x x | x x x |
| V003 | x x x | x x x | x x x |
| . . . | . . . | . . . | . . . |

Fig. 5

| VEHICLE ID | BOX NUMBER | USER ID | SIZE | DEPOSIT POINT | DEPOSIT DATE AND TIME | PICK-UP POINT | PICK-UP DATE AND TIME |
|---|---|---|---|---|---|---|---|
| V001 | 001 | x x x | x x x | x x x | x x x | x x x | x x x |
| | 002 | x x x | x x x | x x x | x x x | x x x | x x x |
| | 003 | — | — | — | — | — | — |
| | 004 | — | — | — | — | — | — |
| . . . | . . . | . . . | . . . | . . . | . . . | . . . | . . . |

Fig. 6

INFORMATION PROCESSING APPARATUS AND INFORMATION PROCESSING METHOD

CROSS REFERENCE TO THE RELATED APPLICATION

This application claims the benefit of Japanese Patent Application No. 2021-146028, filed on Sep. 8, 2021, which is hereby incorporated by reference herein in its entirety.

BACKGROUND

Technical Field

The present disclosure relates to an information processing apparatus and an information processing method.

Description of the Related Art

There has been known a technique in which a vehicle with a locker mounted thereon moves to a point where a user uses the locker (for example, see Patent Literature 1). In addition, there has also been known a technique of transferring baggage deposited in a locker to a place desired by a user (for example, see Patent Literature 2).

CITATION LIST

Patent Literature

Patent Literature 1: Japanese Patent Application Laid-Open Publication No. 2021-039432
Patent Literature 2: Japanese Patent Application Laid-Open Publication No. 2008-123055

SUMMARY

The object of the present disclosure is to prevent baggage from being damaged when the baggage is moved.

One aspect of the present disclosure is direct to an information processing apparatus including a controller configured to control a vehicle which is equipped with:
 a storage device in which a user can deposit baggage; and
 a storing section configured to store cushioning material that can be used by the user when the user deposits the baggage in the storage device;
 wherein the controller generates a command for replenishment of the cushioning material in the storing section when a remaining amount of the cushioning material in the storing section is less than a predetermined amount.

Another aspect of the present disclosure is directed to an information processing method for controlling a vehicle which is equipped with:
 a storage device in which a user can deposit baggage; and
 a storing section configured to store cushioning material that can be used by the user when the user deposits the baggage in the storage device;
 wherein a computer generates a command for replenishment of the cushioning material in the storing section when a remaining amount of the cushioning material in the storing section is less than a predetermined amount.

In addition, a further aspect of the present disclosure is directed to a program for causing a computer to perform processing in the above-mentioned information processing apparatus, or a storage medium storing this program in a non-transitory manner.

According to the present disclosure, it is possible to suppress baggage from being damaged when the baggage is moved.

BRIEF DESCRIPTION OF THE DRAWINGS

FIG. 5 is a view illustrating an example of a table configuration of a vehicle information DB;
FIG. 6 is a view illustrating an example of a table configuration of a baggage information DB.

DESCRIPTION OF THE EMBODIMENTS

Figure 1:
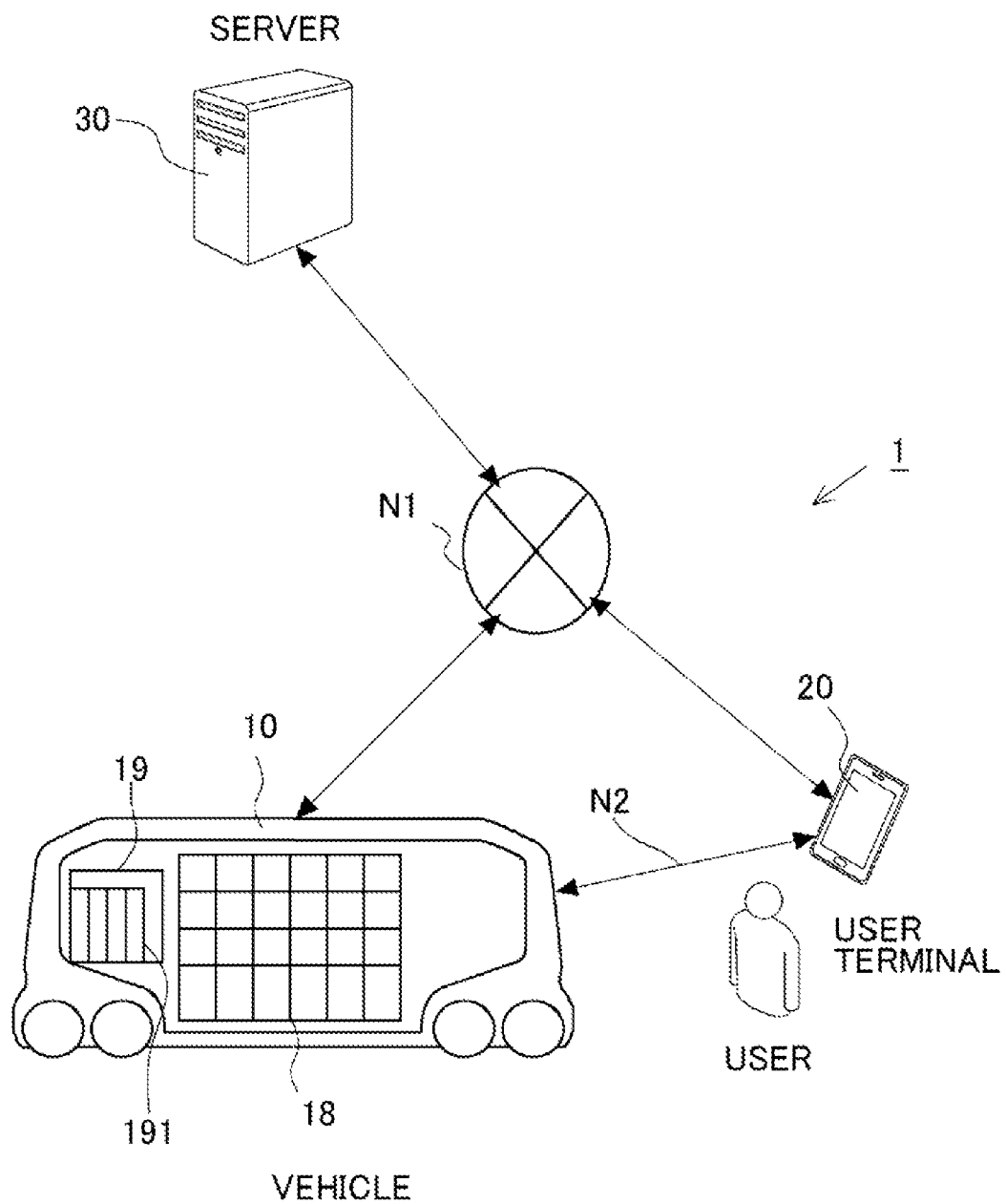
FIG. 1 is a view illustrating a schematic configuration of a system according to an embodiment.

An information processing apparatus, which is one aspect of the present disclosure, includes a controller configured to control a vehicle, the vehicle being equipped with a storage device that allows a user to deposit his or her baggage therein and a storing section that stores cushioning material that can be used by the user when the user deposits the baggage in the storage device.

The storage device, which is mounted on the vehicle, moves together with the movement or travel of the vehicle. Therefore, the user can call the storage device together with the vehicle when depositing or picking up the baggage. Therefore, the user does not have to travel a long distance when depositing or picking up the baggage. In addition, the baggage can be delivered by using the storage device. The user can use the cushioning material when depositing the baggage in the storage device. The cushioning material is placed in the storing section and can be used by the user as needed. By depositing the baggage with the cushioning material arranged so as to protect the baggage, it is possible to suppress damage or the like of the baggage during movement. The cushioning material is, for example, bubble wrap, rubber, cotton, cloth, polystyrene foam, sponge, paper, grass, cardboard, shock absorbing gel, or the like. Note that the cushioning material may be rented for a fee.

By keeping the cushioning material in the storing section and making it available to the user, the user himself or herself can pack the cushioning material into the gaps when the user puts the baggage in the storage device. However, it is conceivable that the amount of the cushioning material is decreased due to wear and tear or loss of the cushioning material as a result of the use thereof. In this case, there is a concern that the cushioning material will be insufficient when the user deposits the baggage.

Accordingly, the controller generates a command for replenishment of the cushioning material in the storing section when the remaining amount of the cushioning material in the storing section is less than a predetermined amount. The predetermined amount is sufficient to protect the baggage of the user. For example, in cases where the storage device has a plurality of compartments for storing baggage, the predetermined amount may be an amount in which the cushioning material can be placed in each compartment. Therefore, the predetermined amount may be determined in accordance with the number of the compartments or the size of the compartments. The command for replenishment of the cushioning material is a command for performing the processing of replenishing the cushioning material with respect to the vehicle or the storage device. This command can include a command for requesting the user to replenish the cushioning material or a command for moving the vehicle to a place where the cushioning material can be replenished.

By performing the processing based on such a command, the cushioning material is replenished into the storing section, thus making it possible to suppress a shortage of the cushioning material. Therefore, it is possible to suppress damage to the baggage due to the shortage of the cushioning material.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to an embodiment. The system 1 is a system in which a user can store his or her baggage or the like in a vehicle 10 with a locker 18 mounted thereon. By calling the vehicle 10 via a server 30, the user can deposit and pick up the baggage at any point. The vehicle 10 is, for example, a vehicle capable of driving autonomously, but may be a vehicle capable of being driven manually by a driver, or may be a vehicle on which an operator rides who monitors the vehicle 10 or the locker 18.

Figure 2:
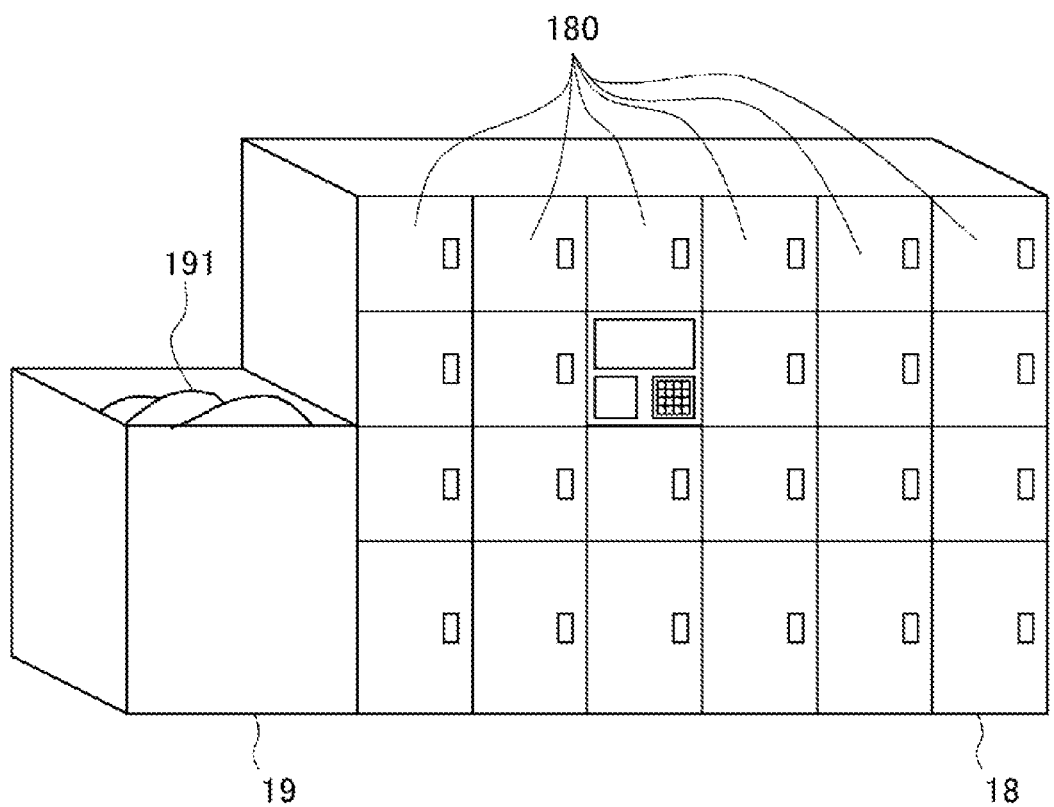
FIG. 2 is a view illustrating an appearance of a locker.

The locker 18 is a device that has a plurality of compartments, wherein baggage can be stored in each compartment. FIG. 2 illustrates the appearance of the locker 18. As illustrated, the locker 18 is configured so that the compartments, i.e., boxes 180, can be accessed by a plurality of doors, respectively. A user of the system 1 can perform an unlocking operation of a designated box 180 by using a user terminal 20 or via an interface provided in the locker 18. The locker 18 is mounted in a cabin of the vehicle 10. The locker 18 is an example of a storage device. In addition, the locker 18 is provided with a storing section 19 for storing cushioning material 191. The user can freely take out and use the cushioning material 191 from the storing section 19. There may be a plurality of types and sizes of cushioning materials.

The user is a user who uses the locker 18. The user terminal 20 is a terminal that is carried by the user. The user can call the vehicle 10, and can lock and unlock the locker 18 by executing a predetermined application installed on the user terminal 20.

The server 30 is a device that manages the operation of vehicles 10. When receiving a dispatch request for a vehicle 10 from the user terminal 20, the server 30 determines a vehicle 10 to be dispatched to the user and instructs the vehicle 10 to operate.

In addition, the server 30 is also a device that manages the locker 18. When the remaining amount of the cushioning material 191 becomes less than a predetermined amount, the server 30 perform processing for replenishing the cushioning material 191. By this processing, the vehicle 10 moves to a place where the cushioning material 191 can be replenished, for example.

The vehicle 10, the user terminal 20 and the server 30 are connected to one another by means of a network N1. The network N1 is, for example, a worldwide public communication network such as the Internet or the like, and a WAN (Wide Area Network) or other communication networks may be adopted. Also, the network N1 may include a telephone communication network such as a mobile phone network or the like, or a wireless communication network such as Wi-Fi (registered trademark) or the like. In addition, the locker 18 is connected to the user terminal 20 via a network N2 including short-range wireless communication or the like. The network N2 performs data communication using, for example, Bluetooth (registered trademark) LowEnergy, NFC (Near Field Communication), UWB (Ultra Wideband), Wi-Fi (registered trademark), or the like.

Figure 3:
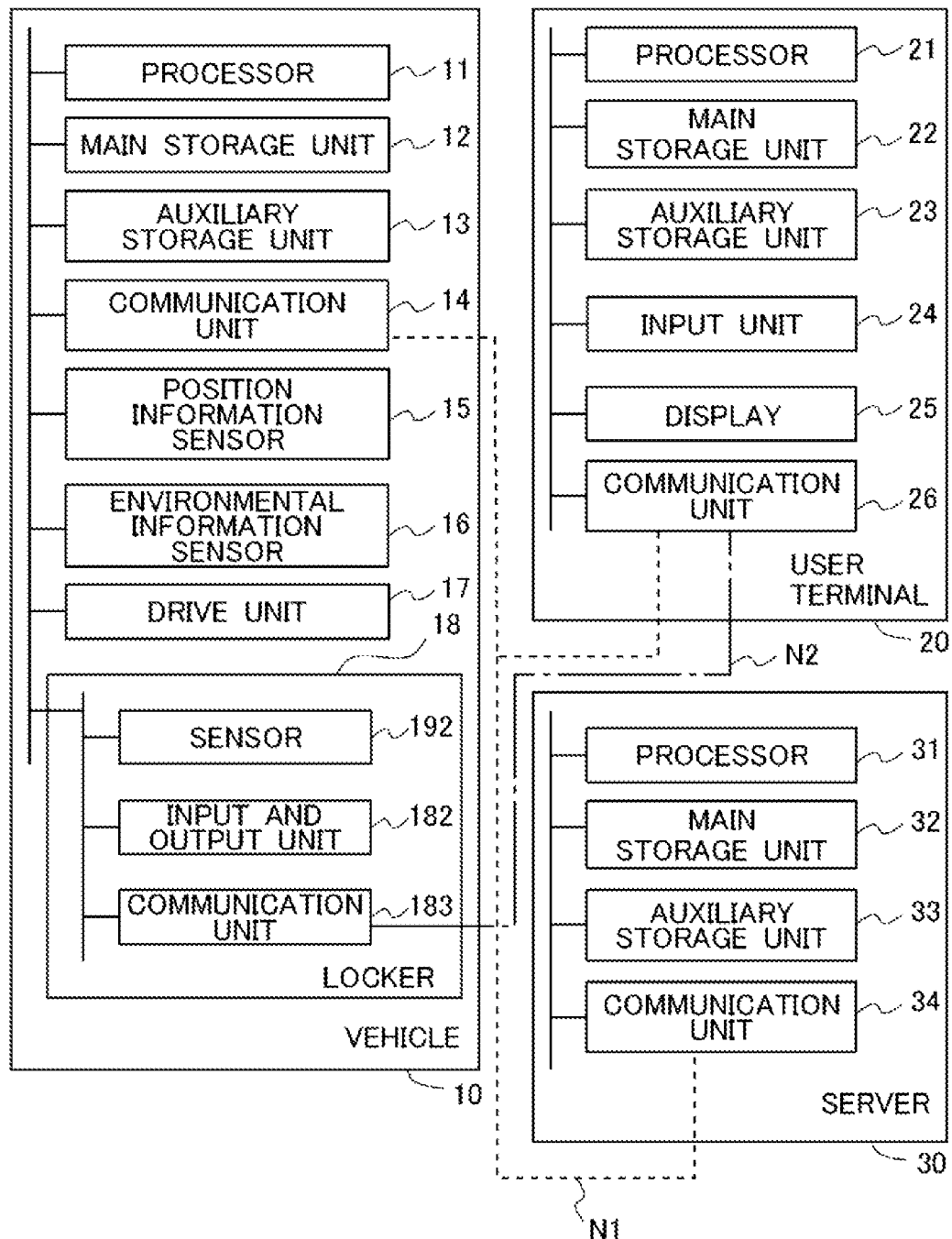
FIG. 3 is a block diagram schematically illustrating an example of a configuration of each of a vehicle, a user terminal and a server, which together constitute the system according to the embodiment.

Hardware configurations and functional configurations of the vehicle 10, the user terminal 20 and the server 30 will be described based on FIG. 3. FIG. 3 is a block diagram schematically illustrating an example of a configuration of each of the vehicle 10, the user terminal 20 and the server 30, which together constitute the system 1 according to the present embodiment.

The server 30 has a configuration of a computer. The server 30 includes a processor 31, a main storage unit 32, an auxiliary storage unit 33, and a communication unit 34. These components are connected to one another by means of a bus. The processor 31 is an example of a controller.

The processor 31 is a CPU (Central Processing Unit), a DSP (Digital Signal Processor), or the like. The processor 31 controls the server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads a program stored in the auxiliary storage unit 33 into a work area of the main storage unit 32 and executes the program, so that each component or the like is controlled through the execution of the program. As a result, the server 30 realizes functions that match predetermined purposes. The main storage unit 32 and the auxiliary storage unit 33 are computer readable recording media. Here, note that the server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the vehicle 10 and the user terminal 20 via the network N1. The communication unit 34 is, for example, a LAN (Local Area Network) interface board, a wireless communication circuit for wireless communication, or the like. The LAN interface board or the wireless communication circuit is connected to the network N1.

Next, the vehicle 10 is, for example, a moving object that is capable of autonomously traveling, and has a computer. The vehicle 10 includes a processor 11, a main storage unit 12, an auxiliary storage unit 13, a communication unit 14, a position information sensor 15, an environmental information sensor 16, a drive unit 17, and the locker 18. These components are connected to one another by means of a bus. The processor 11, the main storage unit 12, and the auxiliary storage unit 13 are the same as the processor 31, the main storage unit 32, and the auxiliary storage unit 33 of the server 30, respectively, and hence, the description thereof will be omitted.

The communication unit 14 is a communication means or unit for connecting the vehicle 10 to the network N1. The communication unit 14 is, for example, a circuit for communicating with other devices (e.g., the server 30 and the like) via the network N1 by making use of a mobile communication service (e.g., a telephone communication network such as 5G (5th Generation), 4G (4th Generation), 3G (3rd Generation), LTE (Long Term Evolution) or the like), and/or a wireless communication such as Wi-Fi (registered trademark), Bluetooth (registered trademark) or the like.

The position information sensor 15 obtains position information (e.g., latitude and longitude) of the vehicle 10 at a predetermined cycle. The position information sensor 15 is, for example, a GPS (Global Positioning System) receiver unit, a wireless communication unit or the like. The information obtained by the position information sensor 15 is recorded, for example, in the auxiliary storage unit 13 or the like and transmitted to the server 30.

The environmental information sensor 16 is a means or unit for sensing the state of the vehicle 10 or sensing the area around the vehicle 10. As a sensor for sensing the state of the vehicle 10, there is mentioned a gyro sensor, an acceleration sensor, an azimuth sensor, or the like. Also, as a sensor for sensing the area around the vehicle 10, there is mentioned a stereo camera, a laser scanner, a LIDAR, a radar, or the like.

The drive unit 17 is a device for driving the vehicle 10 based on control commands generated by the processor 11. The drive unit 17 is configured to include, for example, a plurality of motors or the like for driving rotors provided on the vehicle 10, so that the plurality of motors or the like are driven according to the control commands to realize autonomous driving of the vehicle 10.

The locker 18 is a device that keeps the baggage (luggage) of the user. The locker 18 has a plurality of compartments (hereinafter, referred to as boxes 180) for storing the baggage of the user. In addition, the locker 18 includes an input and output unit 182 and a communication unit 183. The locker 18 is also provided with a sensor 192 for detecting an amount of the cushioning material 191. The sensor 192 may detect, for example, at least one of the mass and the volume of the cushioning material 191 in the storing section 19. The sensor 192, the input and output unit 182, and the communication unit 183 are connected to the processor 11 and the like in the vehicle 10 by means of a bus.

The sensor 192 is attached to the bottom of the storing section 19, for example, and includes a sensor capable of detecting a mass. That is, the mass of the cushioning material 191 stored in the storing section 19 may be detected by detecting a force applied to the bottom surface of the storing section 19. As an alternative, the sensor 192 may include a sensor with a camera (image sensor), for example. That is, the amount of the cushioning material 191 may be detected based on the image data captured by the camera. In this case, the amount of the cushioning material 191 may be detected by detecting the volume of the cushioning material 191. As another alternative, the sensor 192 may include a sensor that detects light irradiated into the box 180. That is, the amount of the cushioning material 191 may be detected by detecting the amount of light. In this case, too, the amount of the cushioning material 191 may be detected by detecting the volume of the cushioning material 191. A plurality of sensors 192 can be provided. Note that in the following description, it is assumed that the sensor 192 detects the amount of the cushioning material 191.

The input and output unit 182 is a unit that receives an input operation performed by a user and presents information to the user. In the present embodiment, it is composed of a single touch panel display. In addition, the input and output unit 182 may also have a further means or unit for exchanging authentication information with the user terminal 20. For example, it may have a camera or the like for reading a two-dimensional bar code.

The communication unit 183 is a communication means or unit for connecting the locker 18 to the network N2. The communication unit 183 is a circuit for communicating with another device (e.g., the user terminal 20 or the like) via the network N2 by making use of a wireless communication network such as Bluetooth (registered trademark) LowEnergy, NFC (Near Field Communication), UWB (Ultra Wideband), Wi-Fi (registered trademark) or the like.

Now, the user terminal 20 will be described. The user terminal 20 is a smart phone, a mobile phone, a tablet terminal, a personal information terminal, a wearable computer (such as a smart watch or the like), or a small computer such as a personal computer (PC). The user terminal 20 includes a processor 21, a main storage unit 22, an auxiliary storage unit 23, an input unit 24, a display 25, and a communication unit 26. These components are connected to one another by means of a bus. The processor 21, the main storage unit 22 and the auxiliary storage unit 23 are the same as the processor 31, the main storage unit 32 and the auxiliary storage unit 33 of the server 30, respectively, and hence, the description thereof will be omitted.

The input unit 24 is a means or unit that receives an input operation performed by the user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display.

The communication unit 26 is a communication means or unit for connecting the user terminal 20 to the network N1 or the network N2. The communication unit 26 is a circuit for communicating with another device (e.g., the vehicle 10, the locker 18, the server 30, or the like) via the network N1 or the network N2 by making use of a mobile communication service (e.g., a telephone communication network such as 5G (5th Generation), 4G (4th Generation), 3G (3rd Generation), LTE (Long Term Evolution) or the like), and/or a wireless communication network such as Wi-Fi (registered trademark), Bluetooth (registered trademark) LowEnergy, NFC (Near Field Communication), UWB (Ultra Wideband) or the like.

Figure 4:
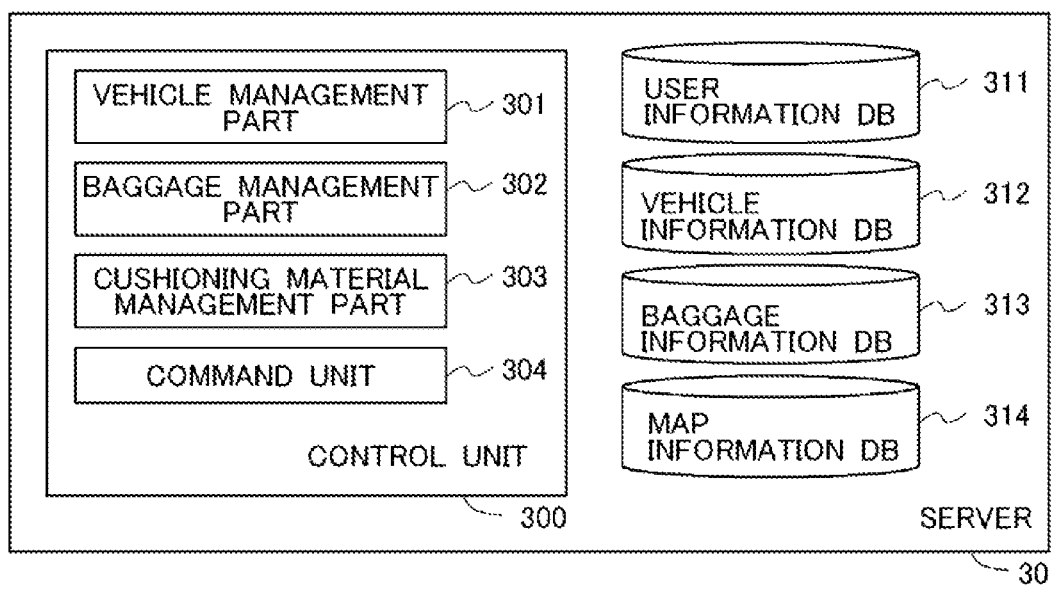
FIG. 4 is a diagram illustrating an example of a functional configuration of the server.

Now, the functions of the server 30 will be described. FIG. 4 is a diagram illustrating an example of a functional configuration of the server 30. The server 30 includes, as its functional components, a control unit 300, a user information DB 311, a vehicle information DB 312, a baggage information DB 313, and a map information DB 314. The processor 31 of the server 30 executes the processing of the control unit 300 by means of a computer program on the main storage unit 32. However, any of the individual functional components or a part of the processing thereof may be implemented by a hardware circuit. The control unit 300 includes a vehicle management part 301, a baggage management part 302, a cushioning material management part 303, and a command part 304.

The user information DB 311, the vehicle information DB 312, the baggage information DB 313, and the map information DB 314 are built by a program of a database management system (DBMS) that is executed by the processor 31 to manage data stored in the auxiliary storage unit 33. The user information DB 311, the vehicle information DB 312, the baggage information DB 313, and the map information DB 314 are, for example, relational databases.

Here, note that any of the individual functional components of the server 30 or a part of the processing thereof may be executed by another or other computers connected to the network N1.

The vehicle management part 301 collects information about vehicles 10 and updates the vehicle information DB 312, which will be described below. To be specific, the vehicle management part 301 periodically communicates with a plurality of vehicles 10 and collects information about the vehicles 10 (hereinafter, also referred to as vehicle information). The information thus collected is reflected in the vehicle information DB 312 described later.

The baggage management part 302 obtains a deposit request from a user who wants to deposit his or her baggage. The deposit request is information for calling a vehicle 10 to deposit the baggage at a point desired by the user. The deposit request is transmitted from the user terminal 20 to the server 30. The deposit request includes information about the user ID, deposit point, deposit date and time, baggage size, and the like. The user ID is an identifier unique to the user. User information (e.g., name, address, telephone number, e-mail address, etc.) corresponding to the user ID may be registered in advance by the user using the user terminal 20, or may be transmitted from the user terminal 20 together with the deposit request. This user information has been stored in the user information DB 311. The user information DB 311 is formed by storing the user information in the auxiliary storage unit 33 described above, where the user and the user information are associated with each other.

The deposit point is a point or location at which the user wants to deposit his or her baggage in the locker 18 of the vehicle 10, and is indicated, for example, by coordinates (latitude and longitude), an address, the name of a building, or the like. The deposit date and time is a date and time when the user wants to deposit the baggage in the locker of the vehicle 10. The deposit date and time may be designated as a time zone having a certain range.

In addition, the baggage management part 302 obtains a pick-up request from a user who wants to pick up his or her baggage. The pick-up request is information for calling the vehicle 10 carrying the baggage to a point desired by the user for the purpose of picking up the baggage. The pick-up request is transmitted from the user terminal 20 to the server 30. The pick-up request includes information about the user ID, the pick-up point, the pick-up date and time, and the like.

The pick-up point is a point or location at which the user wants to pick up his or her baggage from the locker 18 of the vehicle 10, and is indicated, for example, by coordinates (latitude and longitude), an address, the name of a building, or the like. The pick-up date and time is a date and time when the user wants to pick up the baggage from the locker 18 of the vehicle 10. Note that the pick-up date and time may be designated as a time zone with a certain range. In addition, the pick-up request may be transmitted from the user terminal 20 at the same time as the deposit request, or the pick-up request may be transmitted from the user terminal 20 after the deposit request.

The baggage management part 302 stores information included in the deposit request and information included in the pick-up request in the baggage information DB 313, which will be described later.

The cushioning material management part 303 manages the remaining amount of the cushioning material 191 of each vehicle 10. The cushioning material management part 303 detects the remaining amount of the cushioning material 191 based on a detection value of the sensor 192. Then, when the remaining amount of the cushioning material 191 becomes less than the predetermined amount, the vehicle 10 is moved to a place where the cushioning material 191 can be replenished. The place where the cushioning material 191 can be replenished has been registered in advance in the server 30, and this information has been stored in the auxiliary storage unit 33. The place where the cushioning material 191 can be replenished may be, for example, a place where the maintenance of the vehicle 10 is performed, an automobile dealer, an automobile repair shop, an automobile accessories dealer, a cushioning material dealer, a base station of the vehicle 10, a management center that manages the cushioning material 191, or the like.

The cushioning material management part 303 may replenish the cushioning material 191 when the volume of the cushioning material 191 is less than the predetermined amount (volume) or when the mass of the cushioning material 191 is less than the predetermined amount (mass). The predetermined amount may be set according to, for example, the size of the locker 18. That is, as the number of boxes 180 increases, more cushioning material 191 may be required, and hence, the predetermined amount may be increased. The predetermined amount is set as an amount in which the cushioning material 191 is not insufficient.

When receiving the deposit request or the pick-up request, the command part 304 determines a point at which the baggage is to be deposited or picked up (i.e., a point to which the vehicle 10 is to be dispatched; hereinafter, referred to as a dispatch point) and a date and time thereof (hereinafter, referred to as a dispatch date and time), and generates an operation command, which is a command for operating the vehicle 10. The operation command includes, for example, a route of the vehicle 10. The command part 304 generates the route based on the map information stored in the map information DB 314. For example, the command part 304 generates the operation command so that the vehicle 10 starts from the current location and travels through each dispatch point at the dispatch date and time. In addition, the operation command includes a command to keep the baggage from the user or a command to deliver the baggage to the user, at each dispatch point.

For example, when receiving the deposit request from the user, the command part 304 selects a vehicle 10 that can be dispatched (hereinafter, also referred to as a dispatchable vehicle), based on information such as the deposit location, the deposit date and time, the size of the baggage included in the deposit request, and the like. The dispatchable vehicle 10 is a vehicle that has a vacant box 180 in which baggage of a corresponding size can be deposited, and can be moved to the deposit point at the deposit date and time.

Moreover, for example, when receiving the pick-up request from the user, the command part 304 selects a vehicle 10 to be dispatched based on the information such as the user ID, the pick-up point, the pick-up date and time, etc., included in the pick-up request. The vehicle 10 to be dispatched at this time is the vehicle for which the user has already deposited his or her baggage. Therefore, the vehicle 10 in which the user has already deposited the baggage is identified or specified based on the user ID. Then, based on the pick-up point and the pick-up date and time included in the pick-up request, the command part 304 determines whether or not the vehicle 10 can be dispatched to the pick-up point at the pick-up date and time. Note that in cases where the vehicle 10 cannot be dispatched at the pick-up date and time desired by the user, the user terminal 20 may be notified that the baggage cannot be delivered at the pick-up point at the pick-up date and time. At this time, the user terminal 20 may be notified of another date and time when the baggage can be delivered at the pick-up point.

Next, the configuration of vehicle information stored in the vehicle information DB 312 will be described based on FIG. 5. FIG. 5 is a view illustrating an example of a table configuration of the vehicle information DB 312. A vehicle information table has fields for vehicle ID, current location, status and route. In the vehicle ID field, information that can identify each vehicle (vehicle ID) is entered. A vehicle ID is assigned to each vehicle, for example, by the vehicle management part 301. In the current location field, information about the current position or location of each vehicle 10 (position information) is entered. The current location of each vehicle 10 is detected by the position information sensor 15 of the vehicle 10, and transmitted to the server 30.

In the status field, data representing the current state of each vehicle 10 is stored. Specifically, information about the remaining battery capacity of each vehicle 10 or the distance that can be traveled is stored. Note that information about the amount of the cushioning material 191 may be stored in the status field. The amount of the cushioning material 191 can be obtained based on the detection value of the sensor 192. In the route field, information about the route of each vehicle 10 is entered.

Next, the configuration of baggage information stored in the baggage information DB 313 will be described based on FIG. 6. FIG. 6 illustrates an example of a table configuration of the baggage information DB 313. A baggage information table has fields of vehicle ID, box number, user ID, size, deposit point, deposit date and time, pick-up point, and pick-up date and time. In the vehicle ID field, information that can identify each vehicle (vehicle ID) is entered. In the box number field, information that can identify each box 180 (box number) is entered. In the user ID field, information that can identify each user who deposits baggage (user ID) is entered. In the size field, information about the size of the baggage is entered. For example, the size may be indicated by the dimensions of length, width, and depth, or by predefined dimensions such as large, medium, and small.

In the deposit point field, information about a point where the user will deposit the baggage is entered. In the deposit point field, information is entered about a point that can be the destination of the vehicle 10 when the user deposits the baggage in the locker 18 of the vehicle 10, for example, coordinates, an address, a name of a building or the like. In the deposit date and time field, information about the date and time when the user deposits the baggage is entered. In the pick-up point field, information about a point where the user will pick up the baggage is entered. In the pick-up point field, information is entered about a point that can be the destination of the vehicle 10 when the user picks up the baggage in the locker 18 of the vehicle 10, for example, coordinates, an address, a name of a building or the like. In the pick-up date and time field, information about a date and time at which the user will pick up the baggage is entered.

The map information DB 314 stores, as map information, for example, link data about roads (links), node data about node points, intersection data about each intersection, search data to search routes, facility data about facilities, search data to search points, etc. In addition, it may also store information about a speed limit or the like corresponding to each road or information about an attribute of each road.

Figure 7:
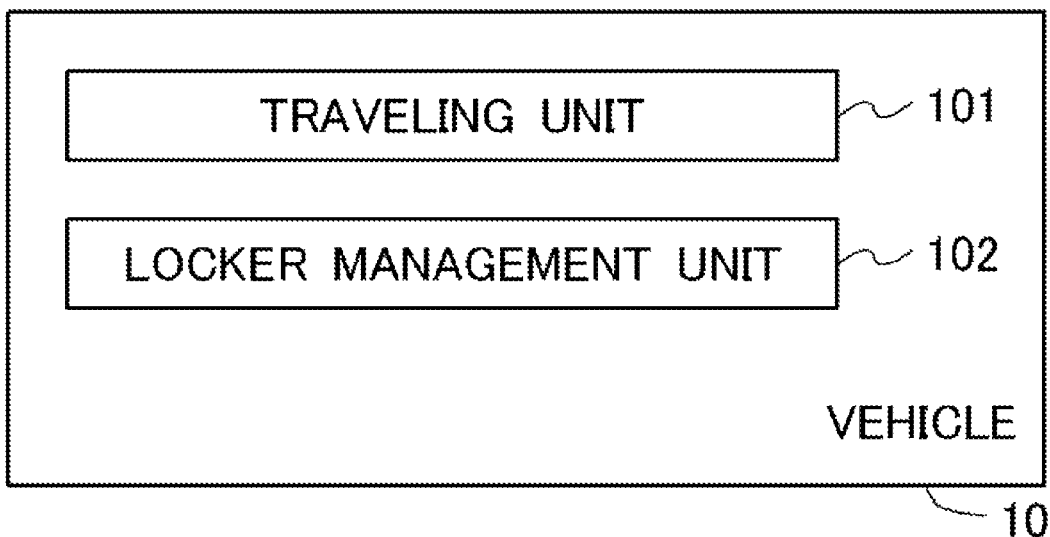
FIG. 7 is a diagram illustrating a functional configuration of the vehicle.

Now, the functions of the vehicle 10 will be described. FIG. 7 is a view illustrating a functional configuration of the vehicle 10. The vehicle 10 includes, as its functional components, a traveling unit 101 and a locker management unit 102. The processor 11 of the vehicle 10 executes the processing of the traveling unit 101 and the locker management unit 102 by a computer program on the main storage unit 12. However, any of the individual functional components or a part of the processing thereof may be implemented by a hardware circuit. Here, note that any of the individual functional components of the vehicle 10 or a part of the processing thereof may be executed by another or other computers connected to the network N1.

The traveling unit 101 controls traveling of the vehicle 10 during autonomous traveling of the vehicle 10. The traveling unit 101 generates control commands for controlling the drive unit 17 by using the data detected by the environmental information sensor 16. The traveling unit 101 controls, for example, the speed, the steering angle, and the like of the vehicle 10 by controlling a plurality of motors to generate a difference in the rotational speed of a plurality of rotors.

For example, the traveling unit 101 generates a travel trajectory of the vehicle 10 based on the data detected by the environmental information sensor 16, and controls the drive unit 17 so that the vehicle 10 travels along the travel trajectory. Here, note that as a method of causing the vehicle 10 to travel in an autonomous manner, there can be adopted a known method. The traveling unit 101 may perform feedback control based on the detection value of the environmental information sensor 16 during autonomous traveling. The traveling unit 101 controls the drive unit 17 so that the vehicle 10 autonomously travels around a predetermined route. This route is included in the operation command transmitted from the server 30.

For example, the traveling unit 101 causes the vehicle 10 to travel based on the travel route and the destination included in the operation command received from the server 30. When there is a deposit request or a pick-up request, the dispatch point becomes the destination. Then, the vehicle 10 is stopped at the dispatch point for the user to deposit or pick up the baggage.

In addition, the traveling unit 101 periodically transmits information about the vehicle 10 to the server 30. The traveling unit 101 transmits information about the current location obtained by the position information sensor 15 and the remaining battery capacity to the server 30 as information about the vehicle 10.

In addition, the locker management unit 102 performs authentication of the user terminal 20 of the user who deposits or picks up the baggage, locking and unlocking of the box 180, detection of forgotten items, and the like. The locker management unit 102 obtains the authentication information of the user terminal 20 from the server 30 via the network N1. Moreover, the locker management unit 102 establishes communication with the user terminal 20 via the network N2 to authenticate the user terminal 20. For example, when the authentication information obtained from the server 30 matches the authentication information obtained from the user terminal 20, the authentication of the user terminal 20 is successful.

When the authentication of the user terminal 20 is successful, the locker management unit 102 unlocks and opens a box 180 corresponding to the size of the baggage entered by the user. Thereafter, when the user closes the door of the box 180, the box 180 is locked, and the server 30 is notified that the user has deposited the baggage. As an alternative, the user may be authenticated according to the information entered into the input and output unit 182 by the user. For example, when a password entered into the input and output unit 182 by the user matches a password obtained from the server 30, the authentication is successful. This password may be determined by the server 30. Alternatively, the password entered into the user terminal 20 by the user may be transmitted from the user terminal 20 to the server 30.

Similarly, in the case of picking up the baggage, the locker management unit 102 obtains the authentication information of the user terminal 20 from the server 30 via the network N1. Moreover, the locker management unit 102 establishes communication with the user terminal 20 via the network N2 to authenticate the user. For example, when the authentication information obtained from the server 30 matches the authentication information obtained from the user terminal 20, the authentication of the user is successful. When the authentication of the user is successful, the box 180 in which the user deposited the baggage is unlocked to open the door thereof. The box number of the box in which the user deposited the baggage may be obtained from the server 30. Alternatively, when the user deposits the baggage, the box number of the box in which the user has deposited the baggage may be stored in the auxiliary storage unit 13 of the vehicle 10.

Further, the locker management unit 102 transmits the detection value of the sensor 192 to the server 30 via the network N1. The transmission of the detection value of the sensor 192 may be performed periodically or in response to a request from the server 30. Note that, alternatively, the detection value of the sensor 192 may be transmitted to the server 30 after the user has picked up the baggage. In addition, as another alternative, the detection value of the sensor 192 may be transmitted to the server 30 only if the detection value of the sensor 192 is less than a predetermined value. Also, as a further alternative, when the detection value of the sensor 192 is less than the predetermined value, information indicating that the detection value of the sensor 192 is less than the predetermined value may be transmitted to the server 30.

Figure 8:
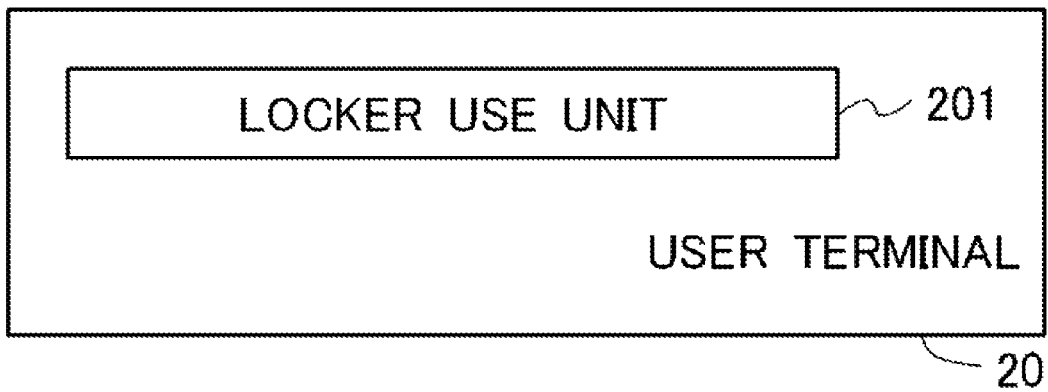
FIG. 8 is a diagram illustrating a functional configuration of the user terminal.

Next, the functions of the user terminal 20 will be described. FIG. 8 is a diagram illustrating a functional configuration of the user terminal 20. The user terminal 20 has a locker use unit 201 as its functional component. The processor 21 of the user terminal 20 executes the processing of the locker use unit 201 by a computer program on the main storage unit 22. However, a part of the processing of the locker use unit 201 may be executed by a hardware circuit. Note that a part of the processing of the locker use unit 201 may be executed by another computer connected to the network N1.

The locker use unit 201 generates a deposit request and a pick-up request according to an input to the input unit 24 of the user terminal 20. The locker use unit 201 displays a screen for using the locker 18 on the display 25. There, for example, a button is displayed together with words "DEPOSIT" and "PICK-UP".

When the user taps the "DEPOSIT" button, the locker use unit 201 prompts the user to enter user information. Note that once the user information is entered, the information may be stored in the auxiliary storage unit 23, so that the user can then use the locker 18 only by entering a password, for example. The user enters or inputs a deposit point, a deposit date and time, an address, a name, a phone number, an e-mail address, and the like through the input unit 24. Upon completion of the user's input, the locker use unit 201 generates a deposit request and transmits it to the server 30 via the network N1.

On the other hand, when the user taps the "PICK-UP" button, the locker use unit 201 prompts the user to enter or input a pick-up point, a pick-up date and time, and the like. When the user completes these inputs via the input unit 24, the locker use unit 201 generates a pick-up request and transmits it to the server 30 via the network N1.

When the deposit request and the pick-up request are transmitted, information about the deposit or pick-up of the baggage may be transmitted from the server 30. For example, information indicating that the baggage can be deposited or picked up under the condition transmitted by the user terminal 20 or information indicating that the baggage cannot be deposited or picked up under the condition transmitted by the user terminal 20 is transmitted from the server 30. The locker use unit 201 displays on the display 25 an image corresponding to the information thus transmitted.

In addition, when the user deposits the baggage into the locker 18 or when the user picks up the baggage from the locker 18, the locker use unit 201 establishes communication with the communication unit 26 of the locker 18 and transmits information about the user to the locker 18. Therefore, the user terminal 20 is used as a key for unlocking the box 180 of the locker 18.

Figure 9:
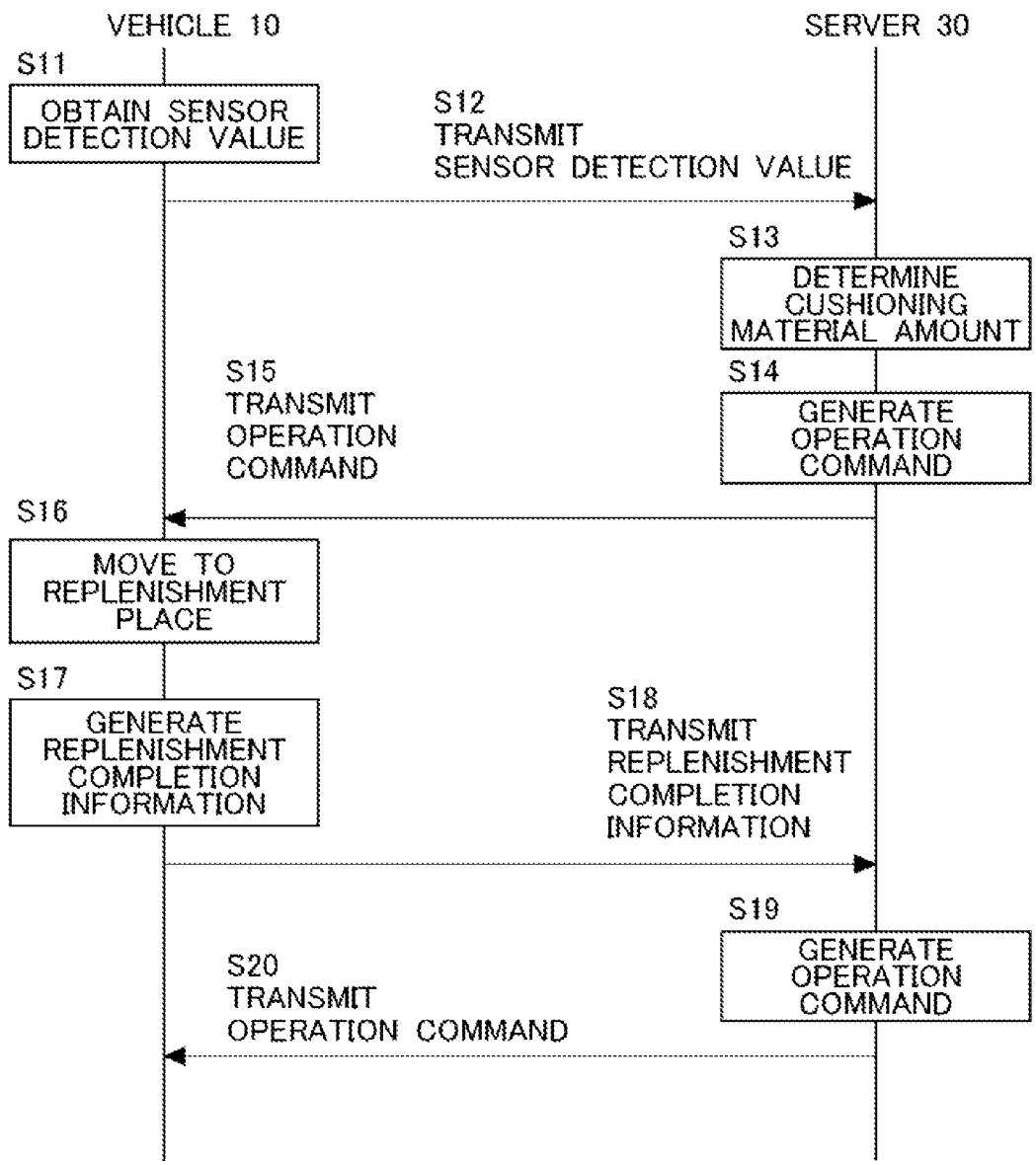
FIG. 9 is a sequence diagram of processing of the system as a whole at the time of replenishing cushioning material in a first embodiment.

Next, the processing of the entire system 1 at the time of replenishing the cushioning material 191 will be described. FIG. 9 is a sequence diagram of processing of the system 1 as a whole when the cushioning material 191 is replenished in a first embodiment. This processing is performed for each vehicle 10. A vehicle 10 obtains a detection value of a sensor 192 attached to a storing section 19 thereof, for example, at predetermined time intervals (S11), and transmits it to the server 30 (S12). The server 30 determines, based on the detected value of the sensor 192, whether or not the amount of the cushioning material 191 is less than the predetermined amount (S13). When it is determined that the amount of the cushioning material 191 is less than the predetermined amount, the server 30 generates an operation command for the vehicle 10 (S14). The operation command may include a command or instruction to move the vehicle 10 to a replenishment place for the cushioning material 191 and then open a door of the vehicle 10 to replenish the cushioning material 191. The server 30 transmits the operation command thus generated to the vehicle 10 (S15).

Upon receiving the operation command, the vehicle 10 moves, based on the operation command, to the replenishment place for the cushioning material 191 and stops there (S16). Then, the vehicle 10 opens the door while stopping and waits for the cushioning material 191 to be replenished. When the replenishment of the cushioning material 191 is completed, for example, a worker enters the completion of the work into the input and output unit 182. As a result, in the vehicle 10, replenishment completion information is generated (S17). The replenishment completion information is information indicating that the replenishment of the cushioning material 191 has been completed. The replenishment completion information thus generated is transmitted to the server 30 (S18).

Upon receiving the replenishment completion information, the server 30 generates an operation command for the vehicle 10 to move to the next destination (S19), and transmits it to the vehicle 10 (S20). Following this operation command, the vehicle 10 moves towards a deposit point or pick-up point of the next user.

Figure 10:
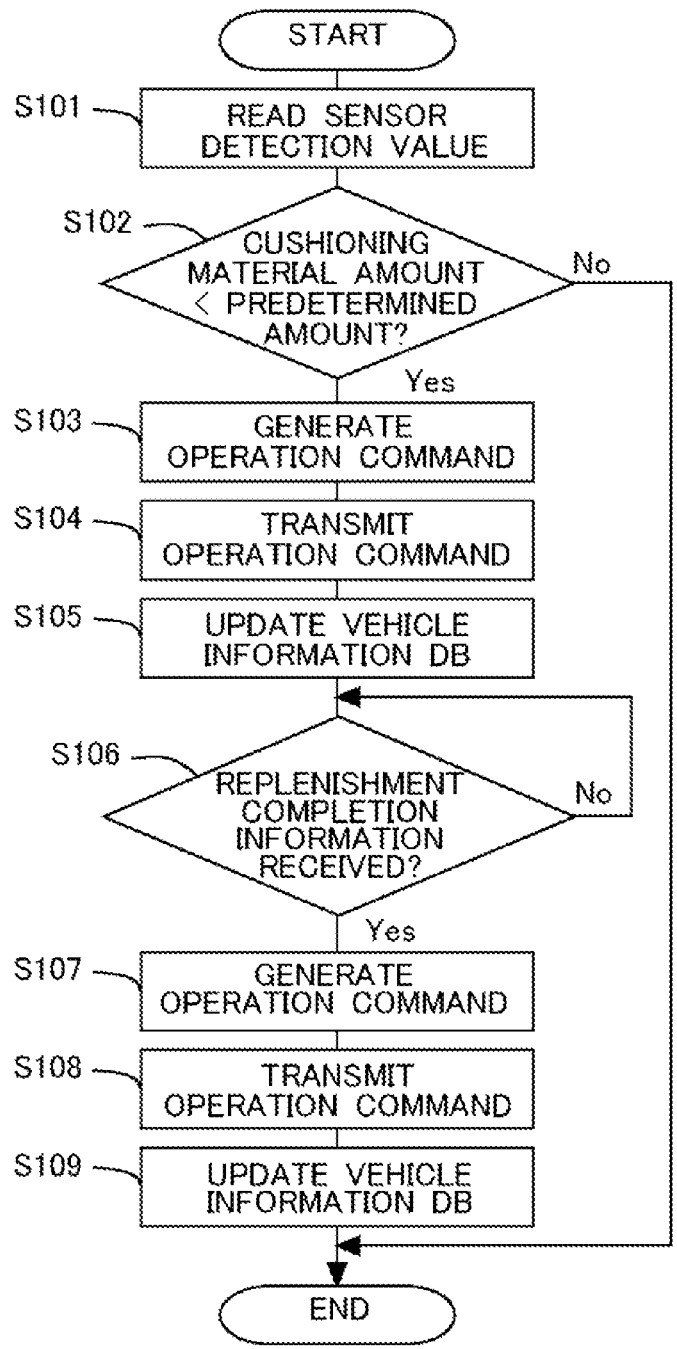
FIG. 10 is a flowchart of processing in the server at the time of replenishing the cushioning material in the first embodiment.

Then, the processing in the server 30 at the time of replenishing the cushioning material 191 will be described. FIG. 10 is a flowchart of the processing or routine in the server 30 when the cushioning material 191 is replenished in the first embodiment. This routine is performed for each vehicle 10.

In step S101, the cushioning material management part 303 reads the detection value of the sensor 192 received from the vehicle 10. The detection value of the sensor 192, which is transmitted from the vehicle 10 at predetermined time intervals, for example, is stored in the auxiliary storage unit 33. In step S101, the cushioning material management part 303 reads the latest detection value of the sensor 192. In step S102, the cushioning material management part 303 determines whether or not the amount of the cushioning material 191, which is the detection value of the sensor 192, is less than the predetermined amount. That is, the cushioning material management part 303 determines whether or not the cushioning material 191 needs to be replenished. The predetermined amount has been stored in the auxiliary storage unit 33 as an amount of the cushioning material 191 that does not need to be replenished. When an affirmative determination is made in step S102, the processing or routine proceeds to step S103, whereas when a negative determination is made, this routine is ended.

Here, note that in cases where the sensor 192 is a sensor that detects mass, the amount of the cushioning material 191 is determined based on the mass of the cushioning material 191, but, for example, in cases where the cushioning material 191 is a plastic packing material with air bubbles (bubble wrap) or polystyrene foam, the mass thereof may hardly change even when the cushioning material 191 is crushed and becomes unusable. In such a case, if the amount of the cushioning material 191 is determined only by the mass thereof, there is a risk that the cushioning material 191 will be insufficient. Therefore, the remaining amount of the cushioning material 191 that can be used may be determined by using a sensor for detecting mass and a camera in combination. That is, if the volume of the cushioning material 191 detected by the camera is less than a predetermined volume even when the mass of the cushioning material 191 detected by the sensor is equal to or greater than a predetermined mass, it is considered that the cushioning material 191 may be insufficient, and an affirmative determination may be made in step S102. In addition, instead of the camera, for example, by detecting the transmittance of light at a predetermined height in the storing section 19, it may be determined whether or not the cushioning material 191 is loaded (stacked) up to that height. If the cushioning material 191 is loaded up to that height, it can be determined that the cushioning material 191 is equal to or more than the predetermined amount. As a further alternative, the determination may be made based solely on the volume of the cushioning material 191 instead of the mass thereof.

In step S103, the command part 304 generates an operation command so that the vehicle 10 moves to the replenishment place for the cushioning material 191 where it is replenished with the cushioning material 191. The operation command includes a route along which the vehicle 10 moves to the replenishment place for the cushioning material 191. This route may be, for example, a route to the nearest replenishment place or the shortest route through the replenishment place and the next baggage deposit point or pick-up point. Then, in step S104, the command part 304 transmits the operation command thus generated to the vehicle 10. Note that, at this time, a terminal used in the replenishment place for the cushioning material 191 may be notified that the vehicle 10 is heading for replenishment of the cushioning material 191. In step S105, the command part 304 updates the vehicle information DB 312. For example, information about the route generated in step S103 is entered into the route field.

In step S106, the cushioning material management unit 303 determines whether or not replenishment completion information has been received from the vehicle 10. The replenishment completion information may be transmitted from the terminal used at the replenishment place, instead of the vehicle 10. When an affirmative determination is made in step S106, the processing proceeds to step S107, whereas when a negative determination is made, the processing of step S106 is executed again.

In step S107, the command part 304 generates an operation command to move the vehicle 10 to the next destination (the next deposit point or next pick-up point), and in step S108, the command part 304 transmits the operation command thus generated to the vehicle 10. This operation command includes a route along which the vehicle 10 moves to the next destination. In addition, in step S109, the command part 304 updates the vehicle information DB 312. For example, information about the route generated in step S107 is entered into the route field.

As described above, according to the first embodiment, when depositing baggage in a box 180 of the locker 18, the user can take out the cushioning material 191 from the storing section 19 as necessary and freely use it, so that the baggage can be protected. In addition, when the remaining amount of the cushioning material 191 is low, an operation command for the vehicle 10 is generated so as to move it to a place where the cushioning material 191 can be replenished, thus making it possible to replenish the storing section 19 with the cushioning material 191. Therefore, it is possible to suppress the shortage of the cushioning material 191 and further prevent the damage of the baggage. Also, by providing the cushioning material 191 in the vehicle 10, it is possible to promote the use of the service of depositing baggage in the locker 18.

Second Embodiment

The first embodiment replenishes the cushioning material 191 based on the detection value of the sensor 192. On the other hand, in a second embodiment, the cushioning material 191 is replenished based on the information obtained from the user. In addition, an incentive is given to the user who provided the information. However, it is not essential to give an incentive to the user. Note that the cushioning material 191 may be replenished by using the detection value of the sensor 192 and the information from the user in combination, or the cushioning material 191 may be replenished based only on the information obtained from the user without using the detection value of the sensor 192.

Even if it is determined that the amount of the cushioning material 191 is equal to or greater than the predetermined amount by detecting the mass or volume thereof by the sensor 192 as in the case of the first embodiment, for example, a case can be conceived where dirt adheres to the cushioning material 191 or the cushioning material 191 cannot be used due to its deterioration. In such a case, by providing the server 30 with information about the amount of the cushioning material 191 that can be used by the user, the server 30 can replenish the cushioning material 191 at a more appropriate timing.

For example, when the user deposits the baggage in the box 180 or picks up the baggage from the box 180, an inquiry may be made to the user as to whether or not the cushioning material 191 is sufficient, so that the amount of the cushioning material 191 may be determined based on a response from the user. This inquiry may be made via the user terminal 20, or via the vehicle 10 or the locker 18. For example, when the user deposits the baggage in the box 180 or picks up the baggage from the box 180, a GUI for selecting a response of either "YES" or "NO" may be displayed on the screen together with a statement such as "IS CUSHIONING MATERIAL SUFFICIENT?" in the input and output unit 182 of the locker 18. Then, the response may be obtained in accordance with an operation of the user. For example, when the user subjectively feels that the cushioning material 191 is insufficient, he or she may respond that the cushioning material 191 is insufficient.

Then, when the user responds that the cushioning material 191 is insufficient, the cushioning material management part 303 of the server 30 determines that the amount of the cushioning material 191 is less than the predetermined amount.

In addition, the incentive given to the user may be, for example, a discount on the locker usage fee, the granting of electronic money, the granting of a coupon ticket, or the like. Also, the fee may be automatically discounted the next time the user uses the locker.

Figure 11:
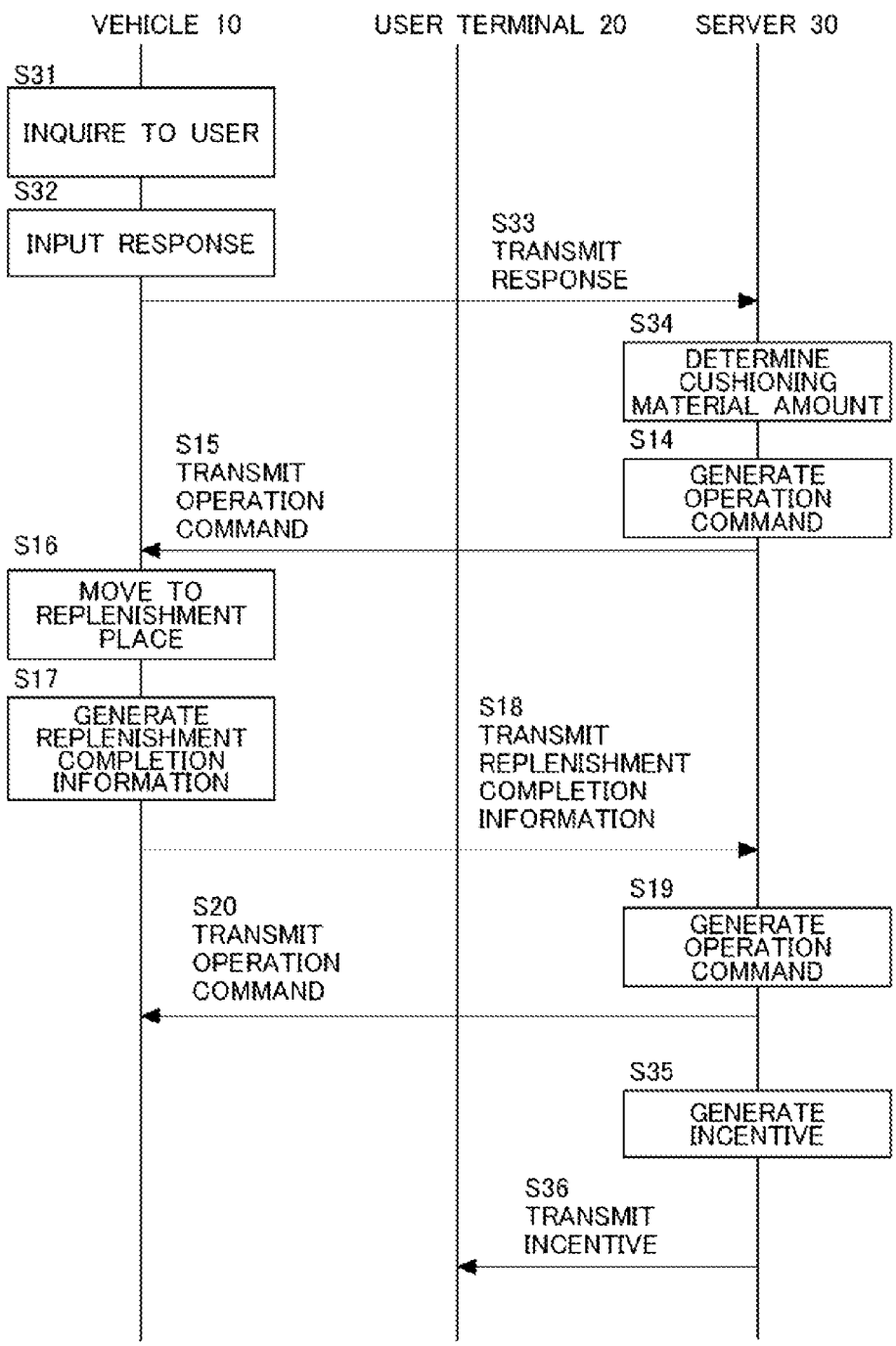
FIG. 11 is a sequence diagram of processing of the system as a whole at the time of replenishing the cushioning material in a second embodiment.

Next, the processing of the system 1 as a whole at the time of replenishing the cushioning material 191 will be described. FIG. 11 is a sequence diagram of the processing of the entire system 1 when the cushioning material 191 is replenished in a second embodiment. This processing is performed for each vehicle 10. Here, note that steps in which the same processing as in FIG. 9 is executed will be denoted by the same reference signs, and the description thereof will be omitted.

When the user deposits the baggage in the box 180 or picks up the baggage from the box 180, an image for making an inquiry to the user as to whether or not the cushioning material 191 is sufficient is displayed on the input and output unit 182 of the locker 18 (S31). The timing for displaying the image can be exemplified as when the user operates the input and output unit 182, or when the user opens and closes the door of the box 180, or when the user locks and unlocks the box 180, or after the user opens the door of the vehicle 10, or the like. Here, note that, as an alternative, an inquiry may be transmitted from the server 30 to the user terminal 20. In this case, the user enters a response or answer to the input unit 24 of the user terminal 20. After the user deposits the baggage in the box 180 or picks up the baggage from the box 180, the server 30 may transmit an inquiry to the user terminal 20. As a further alternative, the user who has determined that the amount of the cushioning material 191 is insufficient may voluntarily activate an application installed on the user terminal 20, for example, thereby to notify the server 30 that the amount of the cushioning material 191 is insufficient via this application.

When a response to whether or not the cushioning material 191 is sufficient is input to the input and output unit 182 of the locker 18 of the vehicle 10 by the user (S32), information corresponding to the input is transmitted to the server 30 (S33). The server 30 determines, based on the input from the user, whether or not the amount of the cushioning material 191 is less than the predetermined amount (S34). That is, when a response indicating that the cushioning material 191 is sufficient is obtained from the user, it is determined that the amount of the cushioning material 191 is equal to or greater than the predetermined amount, whereas when a response indicating that the cushioning material 191 is insufficient is obtained from the user, it is determined that the amount of the cushioning material 191 is less than the predetermined amount.

Here, note that the amount of the cushioning material 191 may be determined by using the response obtained from the user and the detection value of the sensor 192 in combination. For example, when the user responds that the cushioning material 191 is insufficient and the detection value of the sensor 192 is less than a predetermined value, it may be determined that the amount of the cushioning material 191 is less than the predetermined amount. Then, when it is determined that the amount of the cushioning material 191 is less than the predetermined amount, the server 30 generates an operation command for the vehicle 10 to replenish the cushioning material 191 (S14).

In addition, after transmitting the operation command to the vehicle 10 so as to move it to the next destination (S20), the server 30 generates data representing an incentive (S35). This data includes, for example, a coupon code. The data representing this incentive is transmitted to the user terminal 20 (S36). Note that, alternatively, the data representing the incentive may be stored in the auxiliary storage unit 33 of the server 30, so that the charge may be discounted the next time the user uses the locker 18.

Figure 12:
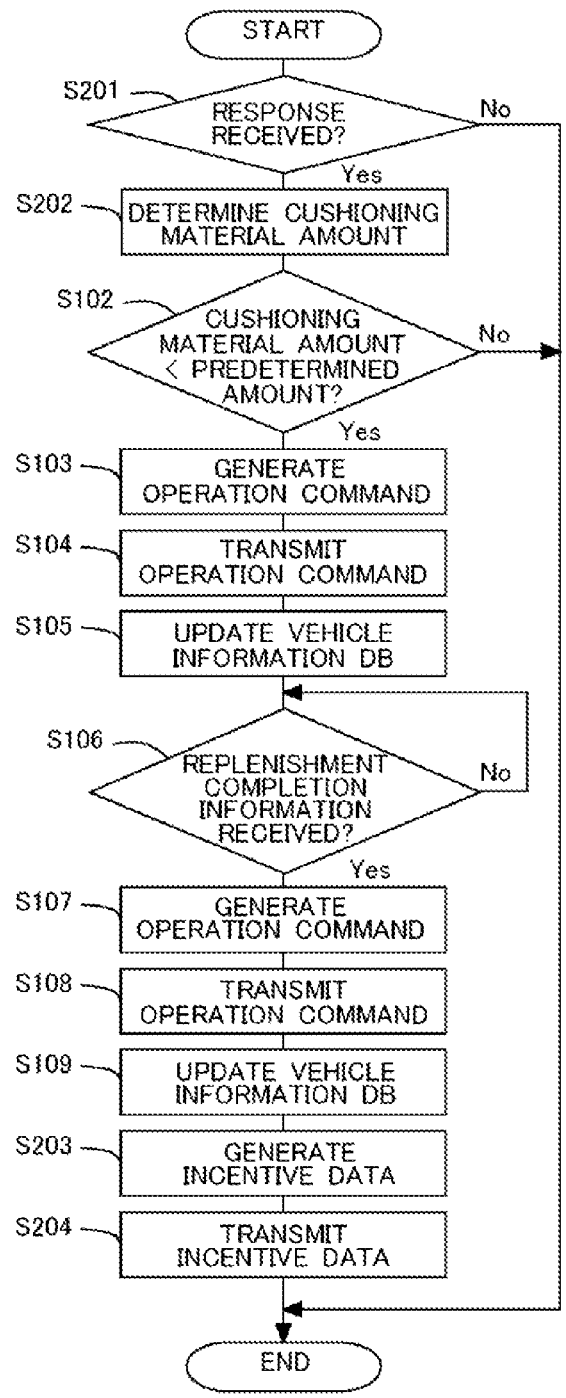
FIG. 12 is a flowchart of processing in the server at the time of replenishing the cushioning material in the second embodiment.

Then, the processing in the server 30 at the time of replenishing the cushioning material 191 will be described. FIG. 12 is a flowchart of the processing or routine in the server 30 when the cushioning material 191 is replenished in the second embodiment. This routine is performed for each vehicle 10. Here, note that steps in which the same processing as in FIG. 10 is executed will be denoted by the same reference signs, and the description thereof will be omitted.

In step S201, the cushioning material management part 303 determines whether or not a user's response regarding the amount of the cushioning material 191 has been received from the vehicle 10. When an affirmative determination is made in step S201, the processing or routine proceeds to step S202, whereas when a negative determination is made, this routine is ended. In step S202, the cushioning material management part 303 determines the amount of the cushioning material 191 stored in the storing section 19. When a response indicating that the cushioning material 191 is insufficient is obtained from the user, it is determined that the amount of the cushioning material 191 is less than the predetermined amount, whereas when a response indicating that the cushioning material 191 is sufficient is obtained from the user, it is determined that the amount of the cushioning material 191 is equal to or greater than the predetermined amount.

Further, in step S203, the cushioning material management part 303 generates data representing an incentive in order to give the incentive to the user. Then, in step S204, the cushioning material management part 303 transmits the data representing the incentive to the user terminal 20.

As described above, according to the second embodiment, it is possible to detect, based on the information provided from the user, that the amount of the cushioning material 191 has become low. Therefore, shortage of the cushioning material 191 can be suppressed. Accordingly, it is possible to prevent the baggage from being damaged.

Third Embodiment

In the first embodiment, the cushioning material 191 in the storing section 19 is replenished when the amount thereof is less than the predetermined amount. However, after using the cushioning material 191, the user may leave the cushioning material 191 in the box 180 without returning it to the storing section 19. In such a case, there is no problem if the cushioning material 191 in the box 180 is returned to the storing section 19 without replenishing the cushioning material 191.

Therefore, in a third embodiment, even if the amount of the cushioning material 191 in the storing section 19 is less than the predetermined amount, in cases where a certain amount of cushioning material 191 remains in the box 180 after the user has picked up the baggage, the replenishment of the cushioning material 191 is not performed when the amount of the cushioning material 191 in the storing section 19 added by the amount of the cushioning material 191 remaining in the box 180 becomes equal to or more than the predetermined amount. In addition, in cases where the user returns the used cushioning material 191 to the storing section 19 at the time of picking up the baggage, an incentive is given to the user.

For example, by attaching cameras as sensors 192 to the storing section 19 and each box 180 and analyzing the data captured by the cameras, it is possible to determine the amount of the cushioning material 191 present in each box 180. In cases where the place or location where the cushioning material 191 is arranged is a box 180 which is not used by a user, the amount of the cushioning material 191 stored in the storing section 19 with the amount of the cushioning material 191 in the box 180 added thereto is compared with the predetermined amount. Note that, as an alternative, the amount of the cushioning material 191 present in the box 180 being used by the user may be further added for comparison with the predetermined amount.

Here, note that, as another alternative, for example, an RFID tag may be attached to each piece of cushioning material 191, and the communication unit 183 of the locker 18 may read each RFID tag to identify the place or location where each piece of the cushioning material 191 is arranged. Thus, the cushioning material 191 left behind in each box 180 can be detected.

Referring to the sequence diagram illustrated in FIG. 9, in S11, detection values are obtained from the sensors 192 attached to the storing section 19 and each box 180. These detection values are transmitted to the server 30 (S12), so that the amount of the cushioning material 191 is determined based on these detection values in the server 30 (S13).

In addition, taking the flowchart illustrated in FIG. 10 as an example, in step S101, the cushioning material management part 303 reads the detection values of the sensors 192 attached to the storing section 19 and each box 180. Then, an amount of available cushioning material 191, which is a total value of the amount of the cushioning material 191 left in the boxes 180 not used by users and the amount of the cushioning material 191 stored in the storing section 19, is calculated. Thereafter, in step S102, the cushioning material management part 303 determines whether or not the amount of available cushioning material 191 is less than the predetermined amount.

Figure 13:
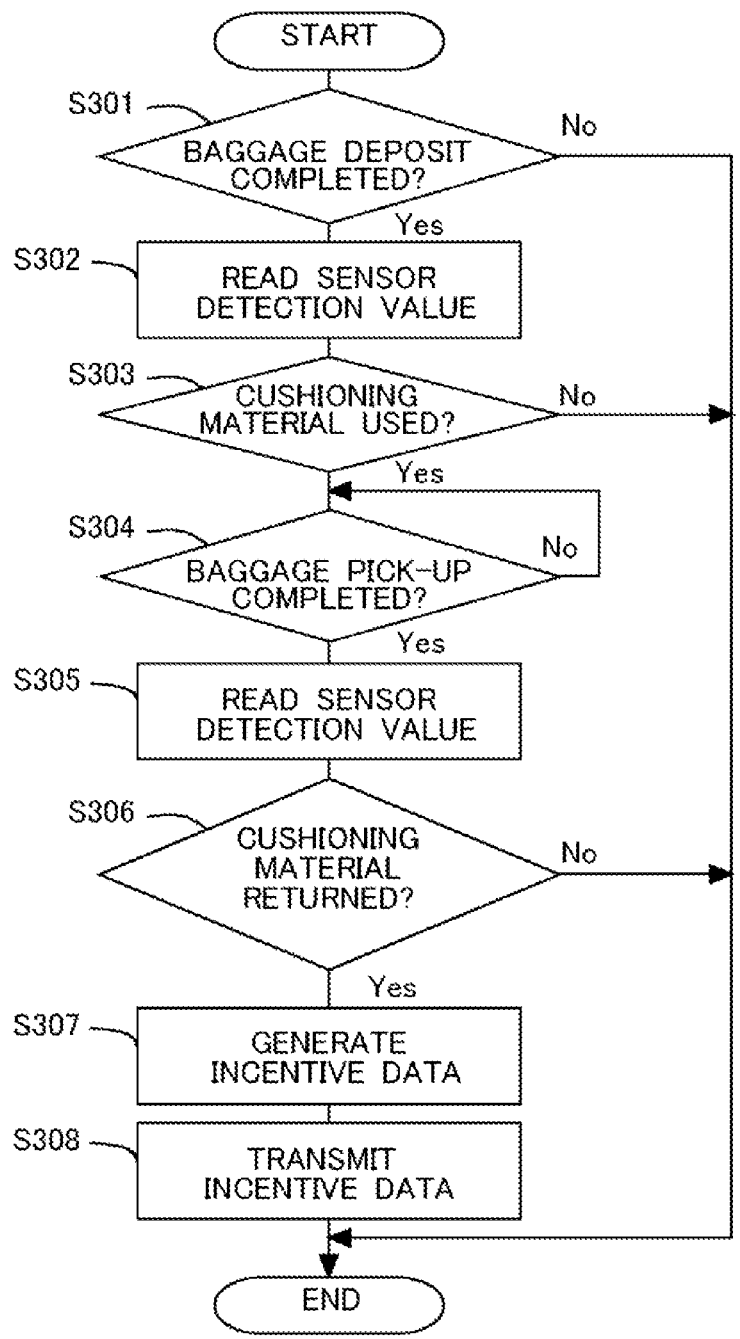
FIG. 13 is a flowchart illustrating processing of giving an incentive to a user who returned the cushioning material to the storing section after using the cushioning material in a third embodiment.

Moreover, FIG. 13 is a flowchart illustrating the processing or routine of giving an incentive to a user who returned the cushioning material 191 to the storing section 19 after using the cushioning material 191 in the third embodiment. This routine is executed for each box 180 of each vehicle 10. In step S301, the cushioning material management part 303 determines whether or not the deposit of the baggage by the user has been completed. For example, when the door of a box 180 is once opened and then closed at the deposit point of the baggage, it is determined that the deposit of the baggage has been completed. Alternatively, when the box 180 is locked after being unlocked at the deposit point of the baggage, it may be determined that the deposit of the baggage has been completed. When an affirmative determination is made in step S301, the processing or routine proceeds to step S302, whereas when a negative determination is made, this routine is ended.

In step S302, the cushioning material management part 303 reads the detection value of the sensor 192 (e.g., the imaging data of the camera) corresponding to the box 180. In step S303, the cushioning material management part 303 determines whether or not the user has used the cushioning material. When the cushioning material has been detected in the box 180 by the sensor 192, the cushioning material management part 303 determines that the cushioning material 191 has been used. When an affirmative determination is made in step S303, the processing or routine proceeds to step S304, whereas when a negative determination is made, this routine is ended.

In step S304, the cushioning material management part 303 determines whether or not the pick-up of the baggage by the user has been completed. For example, when the door of a box 180 is once opened and then closed at the pick-up point of the baggage, it is determined that the pick-up of the baggage has been completed. Alternatively, when the box 180 is locked after being unlocked at the pick-up point of the baggage, it may be determined that the pick-up of the baggage has been completed. When an affirmative determination is made in step S304, the processing proceeds to step S305, whereas when a negative determination is made, the processing of step S304 is executed again.

In step S305, the cushioning material management part 303 reads the detection value of the sensor 192 corresponding to the box 180. In step S304, the cushioning material management part 303 determines whether or not the cushioning material has been returned from the box 180 to the storing section 19. When the cushioning material has not been detected in the box 180 by the sensor 192, the cushioning material management part 303 determines that the cushioning material 191 has been returned. Further, it may be determined whether or not the cushioning material 191 has increased in the storing section 19, and only when the cushioning material 191 has increased, it may be determined that the cushioning material 191 has been returned. When an affirmative determination is made in step S306, the processing or routine proceeds to step S307, whereas when a negative determination is made, this routine is ended.

In step S307, the cushioning material management part 303 generates data representing an incentive in order to give the incentive to the user. Then, in step S308, the cushioning material management part 303 transmits the data representing the incentive to the user terminal 20.

As described above, according to the third embodiment, even when the amount of the cushioning material 191 in the storing section 19 has decreased, in cases where a sufficient amount of the cushioning material 191 remains in a box 180, the cushioning material 191 is not replenished, thus making it possible to prevent the vehicle 10 from moving to the replenishment place for the cushioning material 191 more than necessary. In addition, when the user who has used the cushioning material 191 returns the cushioning material 191 to the storing section 19, an incentive is given to the user, thus making it possible to promote the user to return the cushioning material 191 to the storing section 19. Thus, the amount of the cushioning material 191 left in the box 180 can be decreased.

Fourth Embodiment

In the first embodiment, when the amount of the cushioning material 191 in the storing section 19 of a vehicle 10 is less than the predetermined amount, the cushioning material 191 is replenished by moving the vehicle 10 to a place where the cushioning material 191 can be replenished. On the other hand, in a fourth embodiment, a second storing section 193 for storing spare cushioning material 191 is provided, wherein when the amount of cushioning material 191 in the storing section 19 becomes less than the predetermined amount, a user is requested to replenish the cushioning material 191 from the second storing section 193 into the storing section 19. Then, an incentive is given to the user who has replenished the cushioning material 191. Note that it is not essential to provide an incentive.

Figure 14:
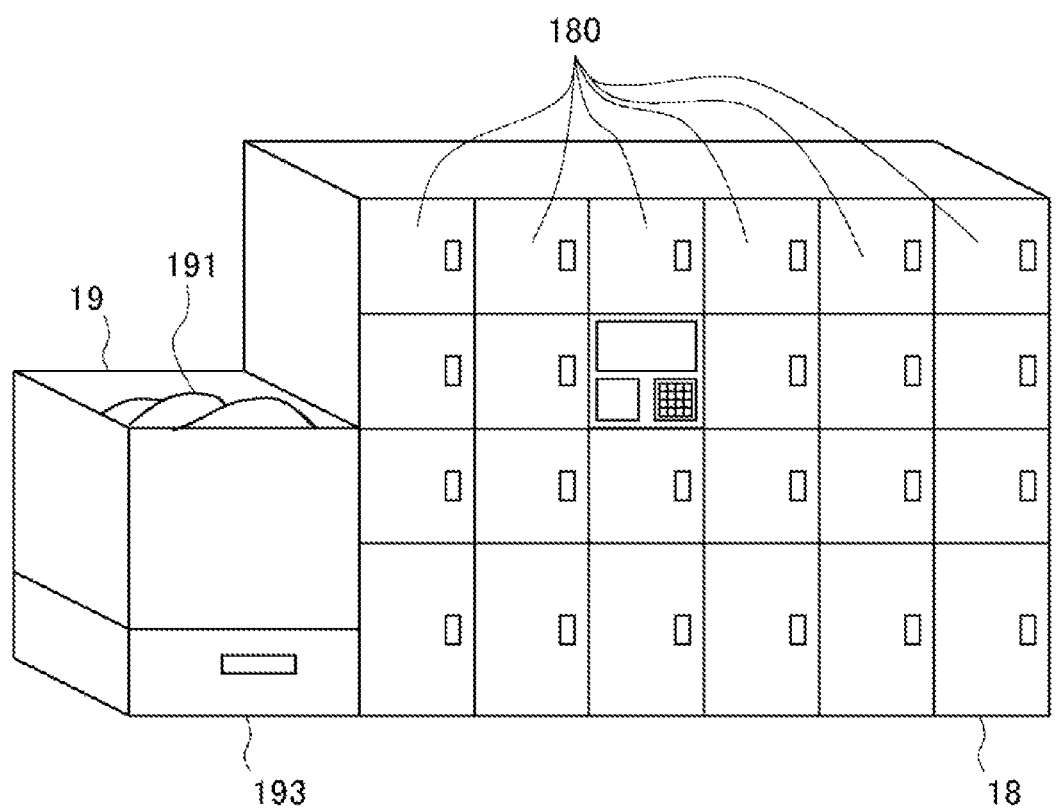
FIG. 14 is a sequence diagram of processing of the system as a whole at the time of requesting a user to replenish the cushioning material in a fourth embodiment.

FIG. 14 is a view illustrating an appearance of a locker 18 in the fourth embodiment. For example, the second storing section 193 is provided at a lower portion of the storing section 19, and the spare cushioning material 191 is arranged or stored in the second storing section 193. The server 30 requests the user to replenish the cushioning material 191 by displaying characters (text) on a display, which is the input and output unit 182 of the locker 18, or outputting sound from a speaker, which is the input and output unit 182 of the locker 18. Here, note that, as an alternative, the server 30 may request the user to replenish the cushioning material 191 by displaying characters (text) on the display 25 of the user terminal 20 or outputting sound from the speaker of the user terminal 20. Also, a sensor 192 may detect the amount of the cushioning material 191 stored in the second storing section 193.

The timing for requesting the replenishment of the cushioning material 191 can be exemplified as when the user operates the input and output unit 182 of the locker 18, or when the user opens and closes the door of the box 180, or when the user locks and unlocks the box 180, or after the user opens the door of the vehicle 10, or the like. In addition, in cases where the request is transmitted to the user terminal 20, the timing may be at the time of transmitting a deposit request or at the time of transmitting a pick-up request.

Figure 15:
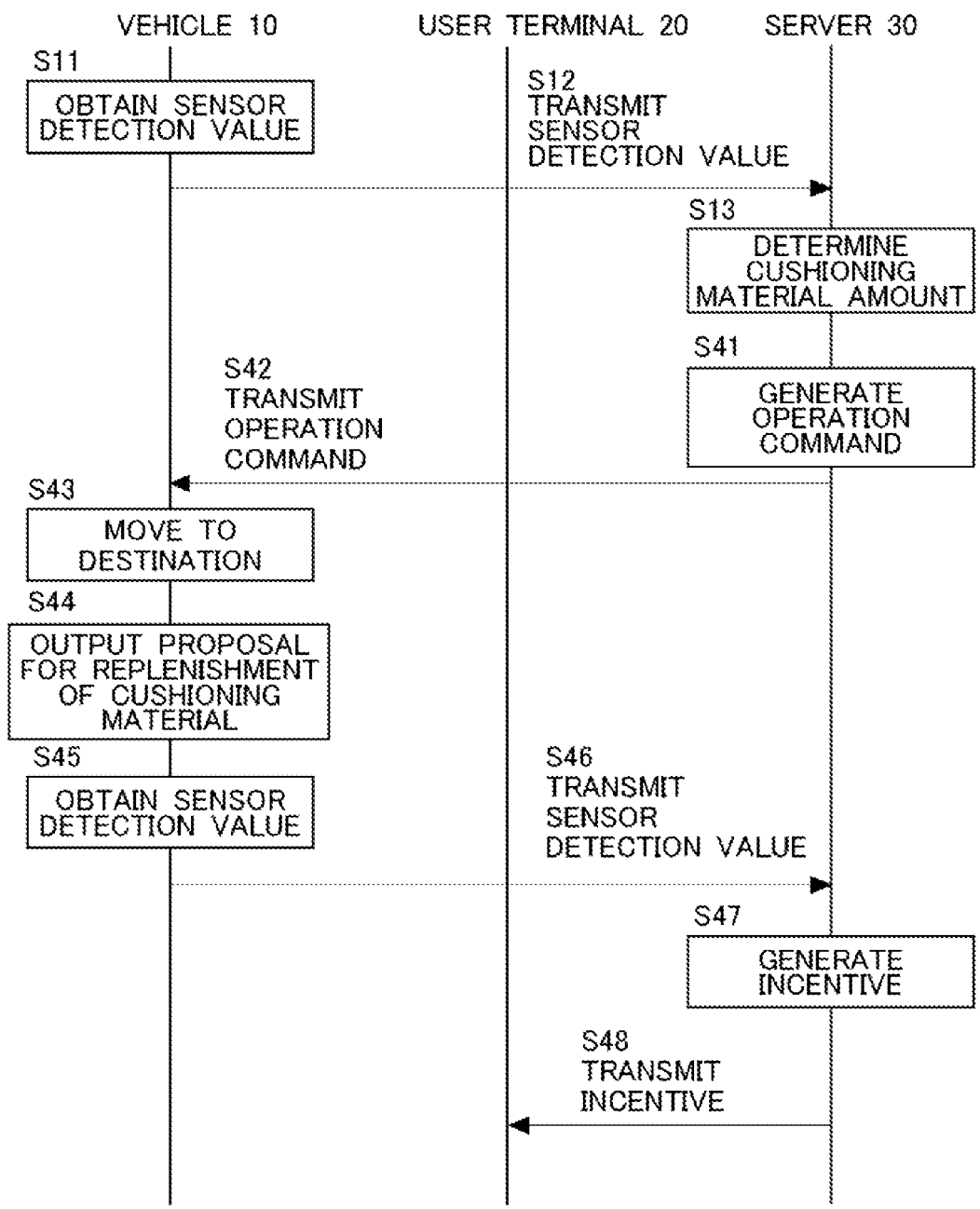
FIG. 15 is a sequence diagram of processing of the system as a whole when there is something left behind in the locker.

FIG. 15 is a sequence diagram of the processing of the system 1 as a whole at the time of requesting a user to replenish the cushioning material 191 in the fourth embodiment. This processing is performed for each vehicle 10. Here, note that steps in which the same processing as in FIG. 9 is executed will be denoted by the same reference signs, and the description thereof will be omitted. When it is determined in S13 that the amount of the cushioning material 191 is less than the predetermined amount, the server 30 generates an operation command for the vehicle 10 (S41). This operation command includes a command or instruction to request the user to replenish the cushioning material 191. The server 30 transmits the operation command thus generated to the vehicle 10 (S42).

After receiving the operation command, the vehicle 10 moves to and stops at the next deposit point or pick-up point (S43). Then, when the user opens or closes the door of the box 180, for example, for depositing or picking up the baggage, the vehicle 10 causes the input and output unit 182 to output a request for replenishing the cushioning material 191 (S44). The vehicle 10 obtains the detection value of the sensor 192 attached to the storing section 19 thereof, for example, at predetermined time intervals (S45), and transmits it to the server 30 (S46).

When determining, based on the detection value of the sensor 192, that the cushioning material 191 has been transferred from the second storage 193 to the storing section 19, the server 30 generates data representative of an incentive (S47). For example, a determination may be made as to whether or not the storing section 191 has been replenished, based on a change in the amount of the cushioning material 191 in the second storage 19 and a change in the amount of the cushioning material 191 in the cushioning material 193, and when it is determined that the cushioning material 191 has been replenished, data representing an incentive may be generated. Alternatively, for example, based on the imaging data of a camera, which is the sensor 192, it may be determined whether the user has performed an action to replenish the cushioning material 191, and when it is determined that the action has been performed, data representing an incentive may be generated. The incentive thus generated is transmitted to the user terminal 20 (S40).

Figure 16:
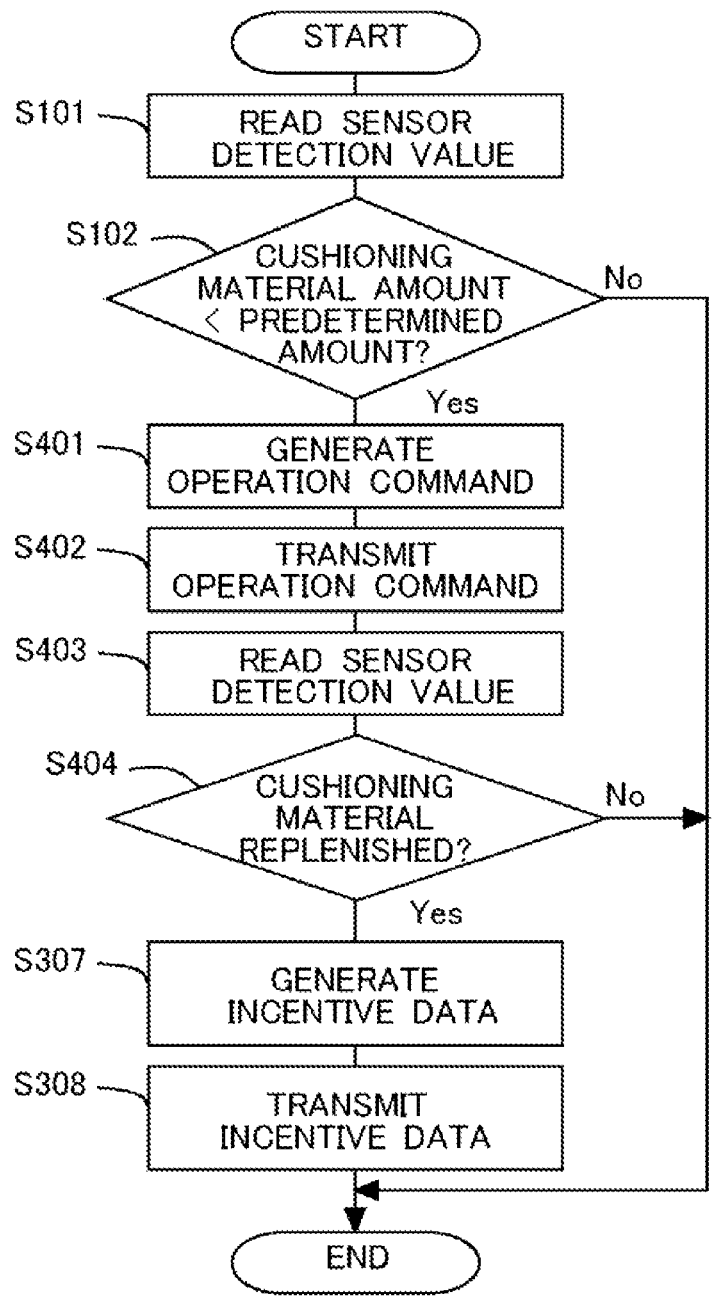
FIG. 16 is a flowchart of processing in the server at the time of replenishing the cushioning material in the fourth embodiment.

Then, the processing in the server 30 at the time of replenishing the cushioning material 191 will be described. FIG. 16 is a flowchart of the processing or routine in the server 30 when the cushioning material 191 is replenished in the fourth embodiment. This routine is performed for each vehicle 10. Here, note that steps in which the same processing as in FIG. 10 or FIG. 12 is executed will be denoted by the same reference signs, and the description thereof will be omitted.

In the flowchart illustrated in FIG. 16, when an affirmative determination is made in step S102, the processing proceeds to step S401. In step S401, the command part 304 generates an operation command for causing the input and output unit 182 to output a request to move the cushioning material 191 from the second storing section 193 to the storing section 19 (i.e., a request to replenish the cushioning material 191). This operation command is generated such that the request for replenishment of the cushioning material 191 is output, for example, at a timing at which the user opens or closes the box 180 at a deposit point or pick-up point. Then, in step S402, the command part 304 transmits the operation command to the vehicle 10.

In step S403, the cushioning material management part 303 reads the detection value of the sensor 192 received from the vehicle 10. The detection value of the sensor 192, which is transmitted from the vehicle 10 at predetermined time intervals, is stored in the auxiliary storage unit 33. Then, in step S403, the cushioning material management part 303 reads the latest detection value of the sensor 192.

In step S404, the cushioning material management part 303 determines whether or not the user has replenished the cushioning material 191 from the second storing section 193. For example, when the amount of the cushioning material 191 in the second storing section 193 has decreased and the amount of the cushioning material 191 in the storing section 19 has increased, it is determined that the user has replenished the cushioning material 191. Alternatively, in the case of the sensor 192 being a camera, when the user's motion of moving the cushioning material 191 from the second storing section 193 to the storing section 19 is imaged or captured by the camera, it may be determined that the user has replenished the cushioning material 191. When an affirmative determination is made in step S404, the processing or routine proceeds to step S307, whereas when a negative determination is made, this routine is ended.

As described above, according to the fourth embodiment, it is possible to suppress the shortage of the cushioning material 191 by requesting the user to replenish the cushioning material 191. Accordingly, it is possible to prevent user's baggage from being damaged.

Other Embodiments

The above-described embodiments are merely examples, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the server 30 may include a part of the functions of the vehicle 10. Also, for example, the vehicle 10 may include a part or all of the functions of the server 30.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus including a controller configured to control a vehicle which is equipped with:
    a storage device in which a user can deposit baggage; and
    a storing section configured to store cushioning material that can be used by the user when the user deposits the baggage in the storage device;
    wherein the controller:
    determines whether or not a remaining amount of the cushioning material in the storing section is less than a predetermined amount based on an output of a sensor that senses a content of the storing section,
    generates a command for replenishment of the cushioning material in the storing section when the remaining amount of the cushioning material in the storing section is less than the predetermined amount, and
    transmits the command for replenishment of the cushioning material to the vehicle, wherein
    the command for replenishment of the cushioning material includes a command to move the vehicle to a point where the cushioning material can be replenished.

2. The information processing apparatus according to claim 1, wherein
    the command for replenishment of the cushioning material includes a command to request the user to replenish the cushioning material.

3. The information processing apparatus according to claim 2, wherein
    the vehicle is further equipped with a second storing section for storing spare cushioning material in addition to the storing section; and
    when the remaining amount of the cushioning material in the storing section is less than the predetermined amount, the controller generates, as the command for replenishment of the cushioning material in the storing section, a command requesting the user to transfer the spare cushioning material from the second storing section to the storing section.

4. The information processing apparatus according to claim 3, wherein
    the controller:
    determines whether the user has transferred the spare cushioning material from the second storing section to the storing section based on the output of the sensor, and
    generates data representing an incentive to be given to the user who has transferred the spare cushioning material from the second storing section to the storing section.

5. The information processing apparatus according to claim 1, wherein
    the sensor detects the remaining amount of the cushioning material in the storing section, and the controller determines whether or not the remaining amount of the cushioning material is less than the predetermined amount based on a detection value of the sensor.

6. The information processing apparatus according to claim 1, wherein
    the controller also determines whether or not the remaining amount of the cushioning material in the storing section is less than the predetermined amount based on information input by the user.

7. The information processing apparatus according to claim 1, wherein the remaining amount of the cushioning material is a remaining amount of the cushioning material that can be used.

8. The information processing apparatus according to claim 1, wherein
the controller:
determines whether the user has transferred the cushioning material from the storage device to the storing section at a time of picking up the baggage from the storage device based on the output of the sensor, and
generates data representing an incentive to be given to the user when the user has transferred the cushioning material from the storage device to the storing section at the time of picking up the baggage from the storage device.

9. An information processing method for controlling a vehicle which is equipped with:
a storage device in which a user can deposit baggage; and
a storing section configured to store cushioning material that can be used by the user when the user deposits the baggage in the storage device;
wherein a computer:
determines whether or not a remaining amount of the cushioning material in the storing section is less than a predetermined amount based on an output of a sensor that senses a content of the storing section,
generates a command for replenishment of the cushioning material in the storing section when the remaining amount of the cushioning material in the storing section is less than the predetermined amount, and
transmits the command for replenishment of the cushioning material to the vehicle, wherein
the command for replenishment of the cushioning material includes a command to move the vehicle to a point where the cushioning material can be replenished.

10. The information processing method according to claim 9, wherein
the command for replenishment of the cushioning material includes a command to request the user to replenish the cushioning material.

11. The information processing method according to claim 10, wherein
the vehicle is further equipped with a second storing section for storing spare cushioning material in addition to the storing section; and
when the remaining amount of the cushioning material in the storing section is less than the predetermined amount, the computer generates, as the command for replenishment of the cushioning material in the storing section, a command requesting the user to transfer the spare cushioning material from the second storing section to the storing section.

12. The information processing method according to claim 11, wherein
the computer:
determines whether the user has transferred the spare cushioning material from the second storing section to the storing section based on the output of the sensor, and
generates data representing an incentive to be given to the user who has transferred the spare cushioning material from the second storing section to the storing section.

13. The information processing method according to claim 9, wherein
the sensor detects the remaining amount of the cushioning material in the storing section, and the computer determines whether or not the remaining amount of the cushioning material is less than the predetermined amount based on a detection value of the sensor.

14. The information processing method according to claim 9, wherein
the computer also determines whether or not the remaining amount of the cushioning material in the storing section is less than the predetermined amount based on information input by the user.

15. The information processing method according to claim 9, wherein
the remaining amount of the cushioning material is a remaining amount of the cushioning material that can be used.

16. The information processing method according to claim 9, wherein
the computer:
determines whether the user has transferred the cushioning material from the storage device to the storing section at a time of picking up the baggage from the storage device based on the output of the sensor, and
generates data representing an incentive to be given to the user when the user has transferred the cushioning material from the storage device to the storing section at the time of picking up the baggage from the storage device.

* * * * *